March 27, 1934.　　A. C. KORTE　　1,952,442
TRUCK BODY
Filed Aug. 29, 1932　　2 Sheets-Sheet 1

ALFRED C. KORTE
INVENTOR

BY George R. Ericson
ATTORNEY

March 27, 1934.  A. C. KORTE  1,952,442
TRUCK BODY
Filed Aug. 29, 1932  2 Sheets-Sheet 2

ALFRED C. KORTE
INVENTOR

BY George R. Ericson
ATTORNEY

Patented Mar. 27, 1934

1,952,442

UNITED STATES PATENT OFFICE 1,952,442

TRUCK BODY

Alfred C. Korte, St. Louis, Mo., assignor to Metalcraft Corporation, St. Louis, Mo., a corporation of Missouri Application August 29, 1932, Serial No. 630,792

8 Claims. (Cl. 46—48)

This invention relates to truck bodies and particularly to a removable body for small or toy trucks in which the body may be a sealed container of coffee or other merchandise to be mounted on the rear end of the truck. The mounting is preferably detachable so that the container may be removed from the truck without the use of tools, emptied of its contents and the container replaced on the truck for use as a toy.

The invention will be better understood from the following description and the accompanying drawings, referring to which:

Figure 1:
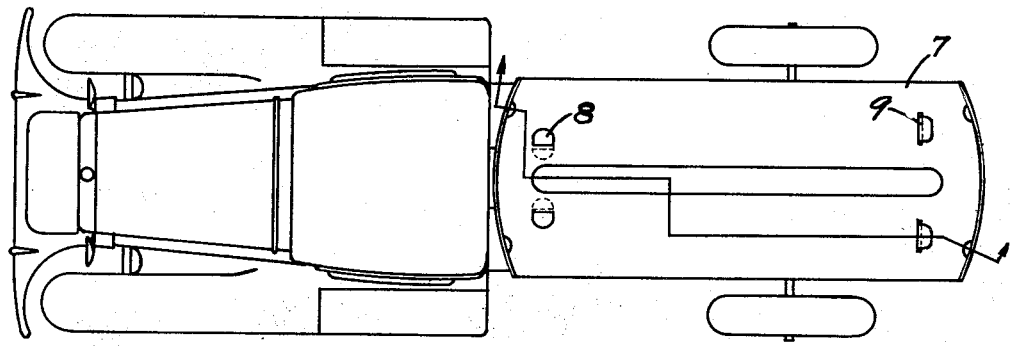
Figure 1 is a plan view of a toy truck with the chassis constructed and arranged to receive a conventional one pound coffee can.
Figure 2:
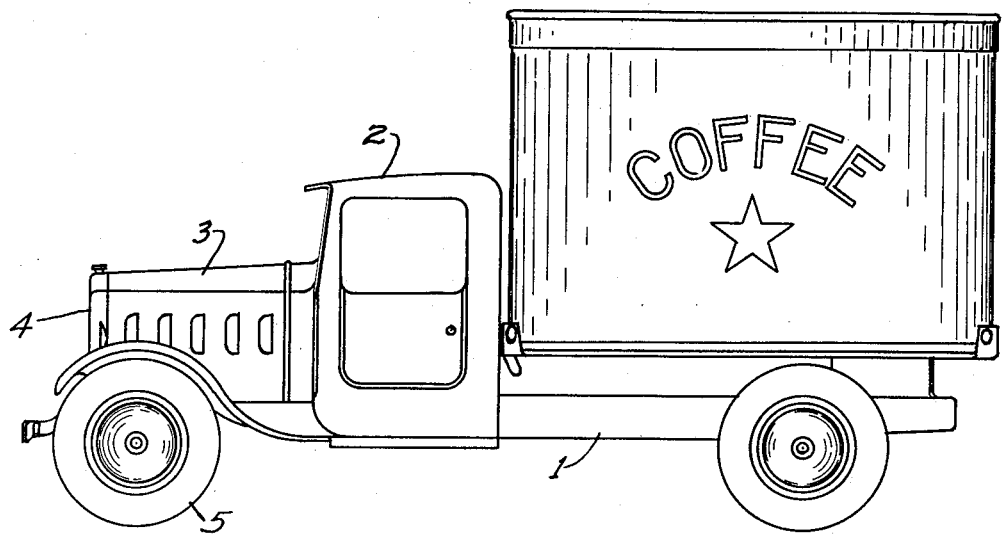
Figure 2 is a side elevation of the truck shown in Figure 1 with the container in place.
Figure 3:
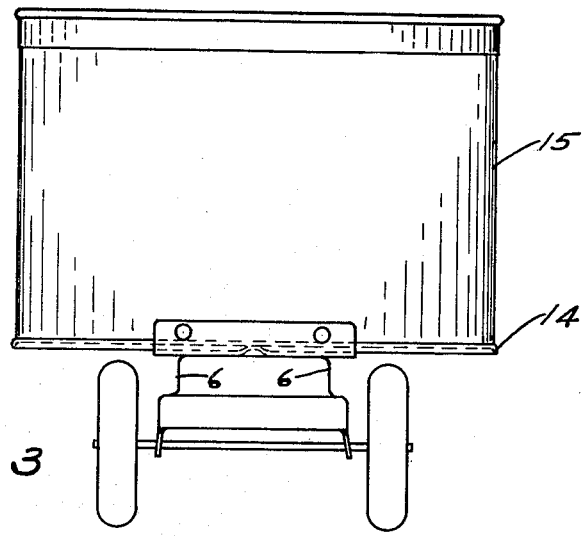
Figure 3 is a rear elevation of the device shown in Figure 2.
Figure 4:
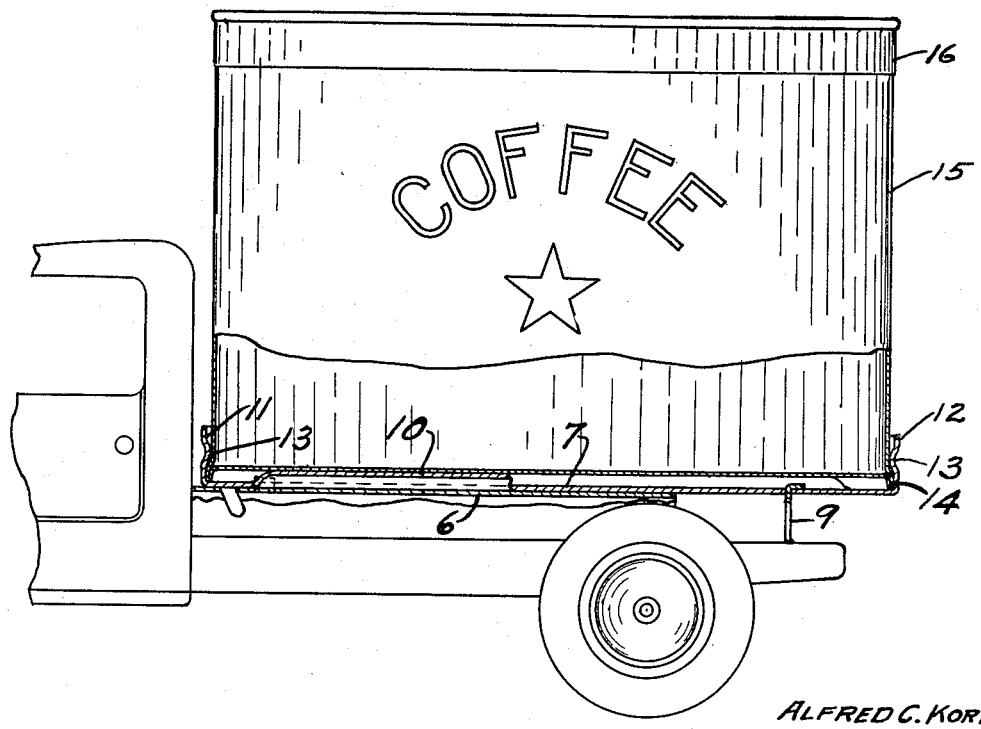
Figure 4 is a view of the rear of the truck on a slightly larger scale, with parts broken away and others shown in sections.

The reference numeral 1 indicates chassis frame of the toy truck which may be made in any suitable manner, preferably of sheet metal, and is provided with the usual body 2, hood 3, radiator 4, wheels 5 and as much additional equipment as may be desired. The side members of the frame are formed with integral sheet metal members, turned upwardly and inwardly as indicated at 6 to form a support for a bed plate 7. A pair of lugs 8 are formed at the front end of the member 6 and a pair of lugs 9 are formed at the rear end, which lugs are adapted to be passed thru suitable openings in the bed plate 7 and turned over as indicated in Figure 1 to hold the bed plate in position. A suitable corrugation 10 is formed in the bed plate to give it longitudinal stiffness.

The front and rear ends of the bed plate are turned upwardly as indicated at 11 and 12 respectively to snugly receive the container which the truck is to carry and suitable depressions or detents 13 are formed in the flanges to fit over the flange 14 which is provided at the lower end of the container. The container, generally indicated by the reference numeral 15 is provided with a cover 16 which may be either an ordinary slip fit or may be of the sealed type. It is preferable, however, that the cover should be of the type which is removable without the use of a can opener or other device which would leave jagged edges that would be dangerous to children.

The bed plate 7 forms a strengthening member and a part of the truck chassis so that the frame 1 may be of lighter sheet metal than is ordinarily used.

In operation the container 15 may be shipped either assembled to the truck or in separate boxes in which case they can be readily placed in position without tools and by persons without any special skill, simply by pressing the containers down into place on the bed plate. The containers, mounted on the truck, make an attractive display or advertising device for shop windows, etc., and the containers can, of course, be removed in the same manner and when emptied of their contents may be replaced and used as a toy truck with a body of substantial capacity.

I claim:

1. A truck body comprising a frame, a cab at the front end of said frame, a bed plate attached to said frame rearwardly of said cab, a pair of upturned resiliently flexible flanges at oppositely disposed parts of said bed plate, each of said flanges having inturned portions spaced from the bottom thereof, and a sheet metal container adapted to be carried by said bed plate and detachably held in position by said inturned portions.

2. In a truck body having a sheet metal frame, a cab at the front end of said frame, a container removably supported on said frame at the rear of said cab, said container having a flange at the lower portion thereof and resiliently flexible detent means carried by said truck and releasably engaging said flange, said container being completely removable from said truck or replaceable thereon merely by applying force to the container and without the use of tools.

3. In a device of the class described, a truck, said truck having a sheet metal chassis, a cab and a hood at the front end of said chassis, a pair of upwardly and inwardly turned longitudinal supports on said chassis at the rear of said cab, a bed plate mounted on said supports, perforations in the bed plate, a plurality of upturned support members extending from said chassis thru said perforations in said bed plate and being turned over to attach said bed plate to said chassis, a pair of flanges turned upwardly at each end of said bed plate, a sheet metal container detachably retained between said flanges and supported by said bed plate, and a removable cover carried by said container.

4. A toy truck having a substantially flat frame at the rear end thereof and a cab and a hood at the front end thereof, a removable sheet metal body for said truck, said body having an outwardly turned flange at the lower end thereof and spring detent means for holding said body in place, said body being detachable or removable merely by applying force thereto.

5. A bed plate for toy trucks comprising an integral sheet metal member, having a flat central portion, upturned flanges at each end, said flanges being so curved as to lie in an arc of a single circle and inturned portions on each of said flanges.

6. A body for toy trucks comprising a sheet metal frame member having a cab mounted at the front end thereof, a pair of longitudinally extending upturned supports carried by said frame at the rear of said cab, a bed plate resting on said supports, said bed plate being substantially greater in length than in width, upturned flanges at each end of said bed plate, a pair of upwardly extending members connected to said frame and said bed plate and being bent over to engage the upper surface of said bed plate.

7. In a device of the class described, a truck frame, a cab at the front of said frame, a substantially flat bed at the rear of said cab, spring detent means at each end of said bed, a cylindrical container adapted to be supported by said bed, said container having a flange at the lower end thereof, said flange being constructed and arranged to be releasably engaged by said detent.

8. In the device of the class described, a truck frame comprising parallel sheet metal members, each of said members comprising a substantially vertical wheel supporting portion and a substantially horizontal portion, a bed plate extending longitudinally of the frame and resting on said horizontal portions, a longitudinal corrugation in said bed plate, said bed plate being turned upwardly to form a flange at each end, inturned portions in each of said flanges, a cylindrical body supported by said bed plate, said body having an outwardly extending flange at the lower end thereof to be releasably engaged by said inturned portions.

ALFRED C. KORTE.